April 28, 1970     J. C. AKFIRAT     3,508,898
APPARATUS AND PROCESS FOR SWEEP QUENCHING GLASS
Filed Sept. 14, 1967
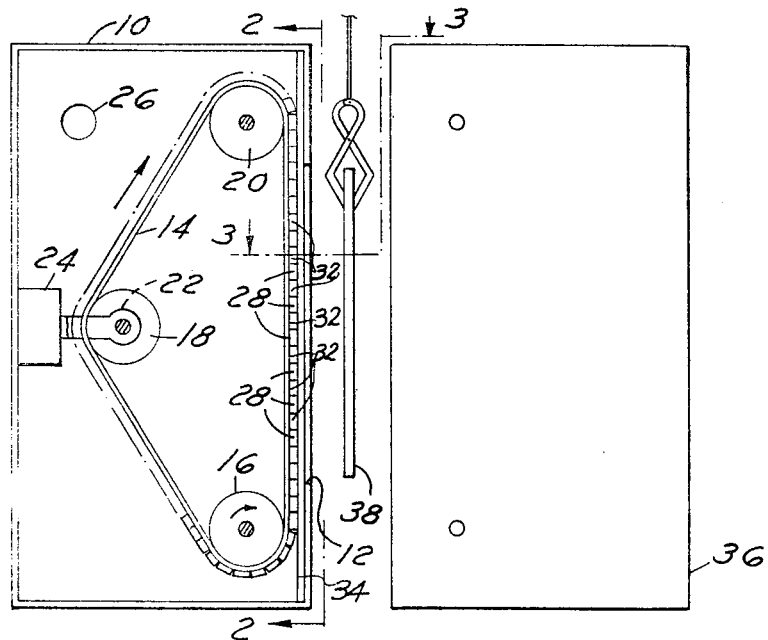
FIG.1
FIG.2
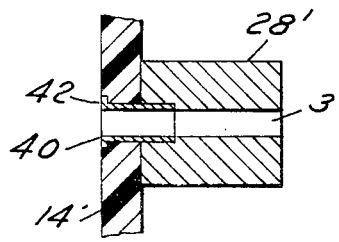
FIG.4
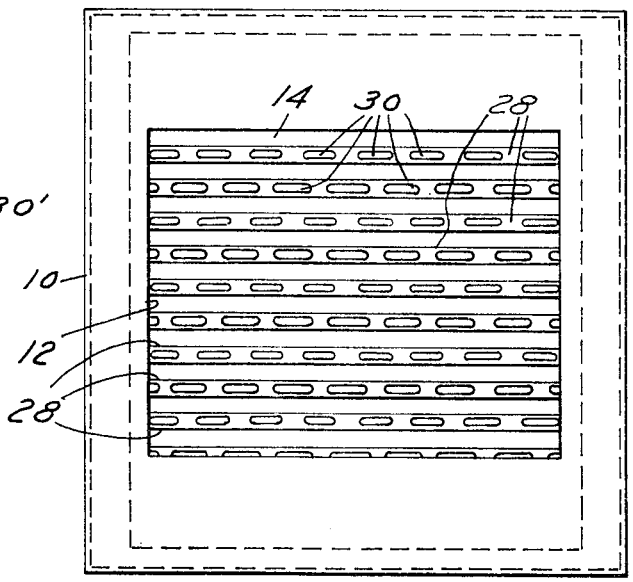
FIG.3
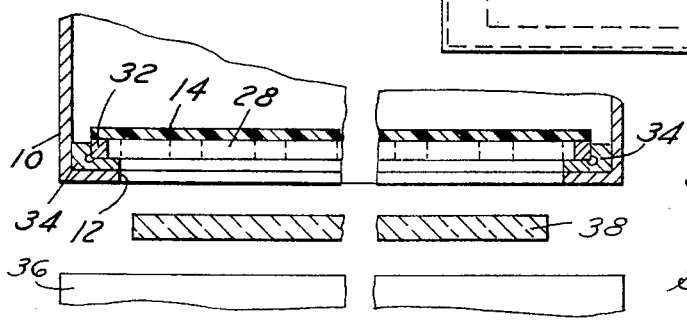
INVENTOR
JOHN C. AKFIRAT
BY
John R. Faulkner
Glenn S. Arendsen
ATTORNEYS United States Patent Office 3,508,898
Patented Apr. 28, 1970

3,508,898
APPARATUS AND PROCESS FOR SWEEP QUENCHING GLASS
John C. Akfirat, Dearborn, Mich., assignor to Ford Motor Company, Dearborn, Mich., a corporation of Delaware
Filed Sept. 14, 1967, Ser. No. 667,694
Int. Cl. C03b 27/00
U.S. Cl. 65—114                                10 Claims

ABSTRACT OF THE DISCLOSURE

A flexible belt moves across an opening in one wall of a housing, the interior of which is pressurized with cooling air. The air passes through slots in spars extending across the belt so the air sweeps a heated sheet of glass positioned in front of the opening, thereby uniformly quenching the glass sheet with a minimum amount of air.

SUMMARY OF THE INVENTION

Virtually all tempered commercial glass is quenched by oscillating heads that direct cooling gas on a heated glass sheet held in a vertical plane by tongs, or by stationary heads that direct gas on a moving glass sheet supported on a horizontal fixture. One additional system worthy of note supports the heated glass on a cushion of air issuing from stationary jets; because it uses large amounts of air and is not adaptable to sheets of various sizes and shapes, this system has been commercialized on a very limited scale. Numerous other quenching systems have been proposed, but have not been commercialized to any significant extent.

These quenching systems attain the high tempering quality required by present automotive standards only with exacting manufacturing control. Even though compliance with safety standards is achieved, an aesthetic deficiency exists when viewing glass installed in vehicles through polarized sun glasses reveals dark splotches or streaks. Additionally, the latter two systems occupy disproportionate amounts of floor space while the oscillating quench heads tend to flutter the glass, a condition in which the glass swings with increasing amplitude between the quench heads and either distorts or shatters upon contact with a head.

This invention provides apparatus that uniformly quenches the surfaces of a glass sheet with less air while occupying a relatively small amount of plant space. The apparatus comprises a housing having an opening therein, an endless belt located in the housing and extending across the opening, and a conveyor for positioning a heated glass sheet in front of the opening. A plurality of apertures are formed in the belt and the housing is pressurized with a cooling gas that passes through the apertures and sweeps the surface of the glass sheet as a motor moves the belt across the opening.

The sweeping action provided by the moving belt eliminates almost all fluttering tendency, especially when the belt moves downward. It is believed this is because of the vertical component of the air velocity, which also prevents a condition known as "snuffing" where the cooling air from the apertures is prevented from reaching the glass surface because of a cushion of relatively stagnant air. Either slots or holes can be used as the apertures, although slots are preferred because they can be arranged in an overlapping fashion. Rigid bars are fastened laterally across the belt at spaced intervals to establish the belt shape, and the apertures can be located in the bars. The apparatus can be located on each side of a heated glass sheet and the belts can be synchronized if desired.

BRIEF DESCRIPTION OF THE DRAWINGS

FIGURE 1 is a sectional elevational view of an arrangement in which the apparatus is located on each side of the heated glass sheet. The figure shows the internal structure of only one apparatus since the apparatus on the other side of the glass sheet is identical. FIGURE 2 is a view of the front of one housing showing the opening in the housing and the apertured belt in the opening. FIGURE 3 is a sectional plan view taken along line 3—3 in FIGURE 1 to show the manner of sealing the sides of the endless belt as it passes the opening. FIGURE 4 is a sectional view of a portion of an alternate embodiment in which the apertures are circular and the rigid members extending laterally across the belt are fastened thereto by hollow rivets.

DETAILED DESCRIPTION

Referring to FIGURES 1 and 2, a housing 10 is completely enclosed except for a rectangular opening 12 in one wall. A continuous belt 14 is mounted in housing 10 on three rolls 16, 18 and 20. The shafts of rolls 16 and 20 are rigidly mounted in housing 10 and roll 16 is driven by a motor (not shown). Roll 18 is supported by yokes at each end thereof, one of which is designated by numeral 22. The shanks of yoke 22 and its corresponding yoke extend outside of belt 14 into a mounting box 24 where a threaded nut (not shown) can be tightened or loosened to move roll 18 in a horizontal plane and thereby adjust the tension in belt 14. An air inlet 26 conducts air under pressure from a pump into the interior of housing 10.

A plurality of spars 28 are fastened to the exterior of belt 14 and extend laterally across the belt. Spars 28 can be made of aluminum, steel, or any other rigid material and can be riveted or bonded to belt 14. Each spar contains a plurality of lateral slots 30 spaced so the slots in one spar overlap with the slots in its adjacent spar (see FIGURE 2). At the edges of the belt, spacers 32 are fastened to the belt between each spar 28. Spacers 32 preferably are made of flexible materials such as neoprene and have the same height and width as the spars but are much shorter, extending usually less than one inch in from the edges of the belt.

As shown in FIGURE 3, two L-shaped bearing members 34 extend vertically on the inside surface of the wall containing the opening, with the corners of the members facing inward and rearward. Spacers 32 and the ends of spars 28 ride in the corners of L-shaped members 34 and thereby seal the edges of the belt assembly when it passes the opening.

In the convenient construction of the spars to the belt shown in FIGURE 4, spar 28' contains a circular passage 30' as the aperture. A hollow rivet 40 passes through belt 14' and is pressed or expanded into a counterbore in passage 30', with a lip 42 on rivet 40 seating against the inner surface of the belt. Air then passes through the rivet into passage 30'. A similar construction can be used with spars containing slots 30 through the use of appropriately shaped hollow members in place of the hollow rivet shown. Instead of a plurality of individual slots, each spar can contain one continuous slot; such an arrangement, however, uses greatly increased amounts of air without a corresponding improvement in quenching.

OPERATION

A housing 36 (see FIGURE 1) identical to housing 10 is spaced a short distance therefrom with the openings in the housing facing each other. A conveyor means (not shown) positions a heated glass sheet 38 between the openings of the housings.

Pulley 16 and its corresponding pulley in housing 36 are rotated by the appropriate motor in the direction of the arrow shown in FIGURE 1. Timing belts and sprockets can be used to connect the motor to the pulleys and to interconnect the pulleys if desired. Air supplied to the interior of the housing passes through the slots in the spars and impinges on the surfaces of the glass sheet 38. Belt movement in the direction of the arrow shown in FIGURE 1 sweeps the air downward across the surface of the glass sheet to produce uniform quenching while preventing flutter and snuffing. As the belt moves over the upper pulley 20, the spars and spacers come together at the edges of the belt and contact the ways of bearing members 34 to form an air tight structure.

An air pressure of approximately 3–4 p.s.i. is maintained in the housing when quenching glass 0.125 inch thick while only about 1 p.s.i. is used in quenching glass 0.250 inch thick. Aluminum spars, ½ inch wide and spaced 1¼ inches apart vertically are fastened to a neoprene coated belt by the FIGURE 4 construction. The holes are 0.187 inch in diameter and are located across the spars at 2 inch intervals with the holes in one spar spaced between the holes in the adjacent spars. The glass is positioned approximately 2 inches from the openings of the holes. A belt speed of 600 inches per minute quenches an 18 x 24 x ⅛ glass sheet heated to 1250° F. so viewing the glass through polarized sun glasses does not reveal any significant variations in shading.

Thus, this invention provides apparatus and a process for uniformly quenching heated glass sheets. The open wall of the housing can be contoured about vertical axes with corresponding contours in the spars, to accommodate curved glass sheets. Contours also can be produced about a horizontal axis by appropriately shaping bearing members 34 and the wall of the housing, so sheets of various sizes and shapes can be tempered. When flat glass is being quenched, any planar member such as a rotating disc can be substituted for the belt. In addition to the vertical position shown, the housing can be located so the opening is horizontal and glass positioned in front of the opening is actually above or below the housing.

What is claimed is:

1. Apparatus for quenching the surfaces of glass sheets comprising
   a housing having an opening therein,
   means for positioning a heated glass sheet in front of said opening,
   an endless belt located in said housing and extending across said opening, said belt having a plurality of apertures therein,
   means for moving said belt, and
   means for pumping a gas into said housing so said gas passes through said apertures and sweeps the surface of the glass sheet as the belt is moved relative to the glass sheet.

2. The apparatus of claim 1 comprising a plurality of rigid members extending laterally across the belt and spaced along the length of the belt, said apertures passing through said rigid members.

3. The apparatus of claim 2 in which the apertures are lateral slots, with the slots in adjacent rigid members overlapping each other.

4. The apparatus of claim 3 comprising spacers attached to the edges of said belt between said rigid members, said spacers sealingly contacting the rigid members to form a substantially continuous wall at the belt edges when the belt is traveling across the opening.

5. The apparatus of claim 4 comprising elongated bearing members fastened to the inside wall of said housing along the sides of said opening, said spacers and the ends of said rigid members bearing against said bearing members while passing said opening.

6. The apparatus of claim 2 in which the apertures are circular holes and the rigid members are fastened to the belt by hollow rivets extending into said holes.

7. A process for quenching the surface of a heated glass sheet that comprises
   positioning a portion of an endless belt adjacent the surface of the glass sheet, said endless belt having a plurality of apertures therein,
   pressurizing the opposite side of said portion of the endless belt with a cooling gas so said gas is directed onto the surface of the glass sheet by the apertures, and
   moving said belt so the cooling gas sweeps the surface of the glass sheet.

8. The process of claim 7 in which the glass sheet is held vertically and the endless belt moves in a downward direction across the glass sheet.

9. The process of claim 8 in which the apertures are horizontal slots spaced on said belt so the gas issuing therefrom sweeps the entire surface of the glass sheet.

10. A process for quenching the surface of a heated glass sheet that comprises
    positioning a portion of a planar member adjacent the surface of the glass sheet, said planar member having a plurality of apertures therein,
    causing a flow of a cooling gas to flow upon the surface of the glass sheet from the apertures, and
    moving said planar member so the cooling gas sweeps the surface of the glass sheet.

References Cited

UNITED STATES PATENTS

| | | | |
|---|---|---|---|
| 1,618,660 | 2/1927 | Howard | 65—119 |
| 3,217,421 | 11/1965 | Lowe et al. | 34—57 X |

ARTHUR D. KELLOGG, Primary Examiner

U.S. Cl. X.R.

34—150, 162; 65—104, 119, 348